US012767778B2

(12) United States Patent
Fung et al.

(10) Patent No.: US 12,767,778 B2
(45) Date of Patent: Oct. 20, 2026

(54) RECOVERING POLYOLEFIN POLYMER FROM THREE-DIMENSIONAL PRINTED OBJECTS

(71) Applicant: PERIDOT PRINT LLC, Palo Alto, CA (US)

(72) Inventors: Erica Fung, San Diego, CA (US); Alay Yemane, San Diego, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 747 days.

(21) Appl. No.: 18/029,080

(22) PCT Filed: Oct. 21, 2020

(86) PCT No.: PCT/US2020/056571
§ 371 (c)(1),
(2) Date: Mar. 28, 2023

(87) PCT Pub. No.: WO2022/086511
PCT Pub. Date: Feb. 8, 2022

(65) Prior Publication Data

US 2023/0357529 A1 Nov. 9, 2023

(51) Int. Cl.

| | |
|---|---|
| ***C08J 11/08*** | (2006.01) |
| ***B29B 17/02*** | (2006.01) |
| ***C08K 3/04*** | (2006.01) |

(52) U.S. Cl.
CPC ............... *C08J 11/08* (2013.01); *B29B 17/02* (2013.01); *C08K 3/04* (2013.01); *C08J 2323/00* (2013.01); *C08J 2323/12* (2013.01)

(58) Field of Classification Search
CPC ................... Y02W 30/62; B29B 17/02; B29B 2017/0213; C08J 11/08; C08J 2323/00–14
See application file for complete search history.

(56) References Cited

U.S. PATENT DOCUMENTS

| | | | | |
|---|---|---|---|---|
| 5,278,282 | A * | 1/1994 | Nauman | B29B 7/94 528/495 |
| 7,879,155 | B1 | 2/2011 | Montie | |
| 10,364,377 | B2 | 7/2019 | Kalfus et al. | |
| 2011/0110817 | A1 | 5/2011 | Lupo et al. | |
| 2018/0171097 | A1* | 6/2018 | Layman | C08J 11/06 |
| 2019/0263052 | A1 | 8/2019 | Amedro et al. | |

FOREIGN PATENT DOCUMENTS

| | | | | |
|---|---|---|---|---|
| CN | 111100327 | A | 5/2020 | |
| ES | 2602252 | A1 * | 2/2017 | B82Y 30/00 |
| WO | 2009/135891 | A1 | 11/2009 | |
| WO | 2018/026829 | A1 | 2/2018 | |
| WO | WO-2019182576 | A1 * | 9/2019 | C08L 53/00 |

OTHER PUBLICATIONS

Miller-Chou, et al. A review of polymer dissolution. Prog. Polym. Sci. 28 (2003) 1223-1270. (Year: 2003).*

Machine Translation of ES2602252 A1. Feb. 20, 2017 (Year: 2017).*

Fabiyi, James S. et al., "Degradation of polypropylene in naturally and artificially weathered plastic matrix composites", Jun. 13, 2014, Ciencia y tecnología, vol. 16, No. 3, pp. 275-290.

* cited by examiner

*Primary Examiner* — Stephen E Rieth
(74) *Attorney, Agent, or Firm* — Dierker & Kavanaugh, P.C.

(57) ABSTRACT

A method of recovering polyolefin polymer from a three-dimensional printed object can include dissolving a polyolefin polymer of a three-dimensional printed object in a polyolefin-dissolving solvent to generate dissolved polyolefin polymer from the three-dimensional object, wherein the three-dimensional printed object includes from about 0.1 wt % to about 10 wt % particulate fusing compound and from about 90 wt % to about 99.9 wt % polyolefin polymer. The method can further include separating the particulate fusing compound from the polyolefin-dissolving solvent and the dissolved polyolefin polymer, and evaporating the polyolefin-dissolving solvent from the dissolved polyolefin polymer.

11 Claims, 2 Drawing Sheets

RECOVERING POLYOLEFIN POLYMER FROM THREE-DIMENSIONAL PRINTED OBJECTS

BACKGROUND

Three-dimensional (3D) printed objects may be formed by an additive printing process that may involve the application of successive layers of material, fusing agent, and heat. Polymeric three-dimensional printed objects prepared using a polyolefin polymeric powder bed material and a fusing agent with radiation absorber and other fluids for application thereof can be different from polymeric objects manufactured using other methods, e.g., injection molding, in that they incorporate fusing agent in their preparation, and thus, can include residual components of the fusing agent dispersed in parts of or even throughout the three-dimensional printed object.

DETAILED DESCRIPTION

Figure 1:
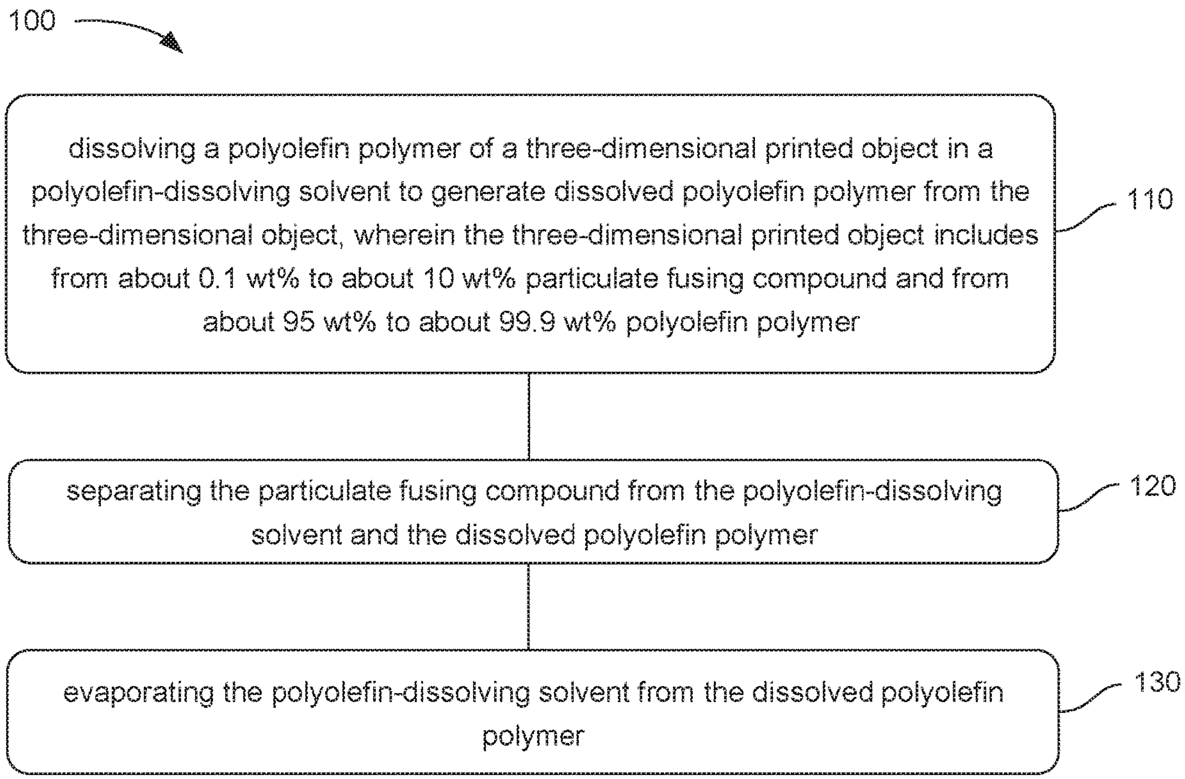
FIG. 1 is a flow diagram illustrating an example method of recovering polyolefin polymer from a three-dimensional printed object in accordance with the present disclosure.

Three-dimensional printing provides one method that uses an additive process involving the application of successive layers of a polyolefin polymeric build material with a fusing agent printed thereon to bind the successive layers of the polyolefin polymeric build material together. More specifically, a fusing agent including a particulate fusing compound, e.g., radiation absorber, can be selectively applied to a layer of a polyolefin polymeric build material on a support bed, e.g., a build platform supporting polymeric build material, to pattern a selected region of a layer of the polyolefin polymeric build material. The layer of the polyolefin polymeric build material can be exposed to electromagnetic radiation, and due to the presence of the particulate fusing compound on the printed portions, absorbed light energy at those portions of the layer having the fusing agent printed thereon can be converted to thermal energy, causing that portion to melt or coalesce, while other portions of the polyolefin polymeric build material do reach temperatures suitable to melt or coalesce. When repeated on a layer-by-layer basis, multi-layered three-dimensional objects can be formed as a monolithic polymeric part, for example.

On occasion, the three-dimensional printing process may result in the formation of a failed three-dimensional object or a rejected three-dimensional object, which can generate waste. In some examples, the amount of waste generated may be immense, e.g., over 10MT failed or otherwise rejected three-dimensional objects per year is estimated. Because of the presence of fusing agent residual components that remain present in these type of three-dimensional objects, the waste may not be easily recycled like other plastics so that the plastic can be reused for other purposes or even for reuse in three-dimensional printing. Without the benefits of recycling, failed or rejected three-dimensional objects may be discarded in landfills or be burned/incinerated, which can contribute to environmental issues. Accordingly, methods for recycling or recovering polymeric build material from three-dimensional printed objects may be desirable.

In accordance with this, a method of recovering polyolefin polymer from a three-dimensional printed object can include dissolving a polyolefin polymer of a three-dimensional printed object in a polyolefin-dissolving solvent to generate dissolved polyolefin polymer from the three-dimensional object, separating the particulate fusing compound from the polyolefin-dissolving solvent and the dissolved polyolefin polymer, and evaporating the polyolefin-dissolving solvent from the dissolved polyolefin polymer. In this example, the three-dimensional printed object that is used in the recovery process includes a particulate fusing compound and from about 90 wt % to about 99.9 wt % polyolefin polymer. The polyolefin-dissolving solvent can include a halogenated aromatic solvent, such as 1,2,4-trichlorobenzene, 1,2,4-tribromobenzene, 1,3,5-trichlorobenzene, or 1,3,5-tribromobenzene for example. The particulate fusing compound can have a D50 particle size of about 10 nm to about 5 μm. Example particulate fusing compounds that may be present in the three-dimensional object (which can be removed or diluted during recovery) include carbon black, lanthanum hexaboride, tungsten bronze, indium tin oxide, aluminum zinc oxide, ruthenium oxide, silver, gold, platinum, iron pyroxene, iron phosphate, copper pyrophosphate, or a combination thereof. The polyolefin polymer can include, for example, a polypropylene polymer, a polyethylene polymer, or a polyethylene-polyethylene copolymer. In an example, evaporating the polyolefin-dissolving solvent from the dissolved polyolefin polymer can be carried out to recover polyolefin polymer having less than a 50 wt % concentration of particulate fusing compound compared to an amount of fusing compound originally present therein based on a total weight of the polyolefin polymer. In further detail, separating the particulate fusing compound from the polyolefin-dissolving solvent and the dissolved polyolefin polymer can include filtering. The method can also include, in some examples, grinding the three-dimensional printed article to a particle size having a length from about 3 mm to about 20 mm and a width or diameter perpendicular to the length from about 2 mm to about 5 mm prior to dissolving. Dissolving can further include heating the three-dimensional object, or particles or portions thereof, to a temperature ranging from about 160° C. to about 250° C. for a time period ranging from about 1 hour to about 24 hours while agitating. In another example, evaporating the polyolefin-dissolving solvent from the dissolved polyolefin polymer can occur in conjunction with a vacuum trap to collect the polyolefin-dissolving solvent evaporated off from the dissolved polyolefin polymer.

In another example, a method of recycling a polyolefin polymer from a three-dimensional printed object can include pelletizing a three-dimensional printed object including from about 90 wt % to about 99.99 wt % polyolefin polymer and from about 0.01 wt % to about 10 wt % residual components including dried residual organic co-solvent and dried residual surfactant to form injection molding pellets having a size ranging from about 750 nm to about 10 μm. In some examples, the residual components can further include a particulate fusing compound, and the particulate fusing compound can be present in the injection molding pellets at from about 0.001 wt % to about 1 wt %.

In another example, recovered polyolefin polymer from a three-dimensional printed object can include from about 90 wt % to about 99.99 wt % polyolefin polymer and from about 0.01 wt % to about 10 wt % residual components including dried residual organic solvent and dried residual surfactant. In one example, the residual components further include a particulate fusing compound, and the particulate fusing compound can be present in the recovered polyolefin polymer at from about 0.001 wt % to about 1 wt %. In further detail, residual components do not include a particulate fusing compound.

When discussing the method of recovering polyolefin polymer from a three-dimensional printed object, the method of recycling polyolefin polymer from a three-dimensional printed object, and/or the recovered polymer from a three-dimensional printed object, these discussions can be considered applicable to one another whether or not they are explicitly discussed in the context of that example. Thus, for example, when discussing the polyolefin polymer in a method of recovering polyolefin polymer from a three-dimensional printed object, such disclosure is also relevant to and directly supported in the context of the method of recycling polyolefin polymer from a three-dimensional printed object, the recovered polyolefin polymer from a three-dimensional printed object, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Methods of Recovering Polyolefin Polymer from Three-Dimensional Printed Objects

A flow diagram of an example method 100 of recovering a polyolefin polymer from a three-dimensional (3D) printed object is shown in FIG. 1. This particular method is effective for recovering polyolefin polymer. The method can include dissolving 110 a polyolefin polymer of a three-dimensional printed object in a polyolefin-dissolving solvent to generate dissolved polyolefin polymer from the three-dimensional object, where the three-dimensional printed object includes a particulate fusing compound and from about 90 wt % to about 99.9 wt % of the polyolefin polymer. The method can also include separating 120 the particulate fusing compound from the polyolefin-dissolving solvent and the dissolved polyolefin polymer and evaporating 130 the polyolefin-dissolving solvent from the dissolved polyolefin polymer.

Dissolving of the polyolefin three-dimensional printed object can occur in a polyolefin-dissolving solvent, such as a halogenated aromatic solvent, such as a tri-halogenated benzene. For example, a trichlorobenzene can be effective for use, e.g., 1,2,4-trichlorobenzene, 1,2,4-tribromobenzene, 1,3,5-trichlorobenzene, 1,3,5-tribromobenzene, etc. These and other halogenated aromatic compounds can be useable as the polyolefin-dissolving solvent if, for example, they are liquid or they are a solid at room temperature that melts below the melting point of the polymer.

Upon evaporation or removal of the polyolefin-dissolving solvent, a polyolefin polymer left behind can be a polyethylene polymer, a polypropylene polymer, or a polyethylene-polypropylene copolymer, for example. An amount of the polyolefin polymer recovered from the method can vary from about 80% to about 95% of the three-dimensional object's mass prior to the recovery, such as when the three-dimensional object excludes filler. In yet other examples, an amount of the polyolefin polymer recovered from the method can vary from about 85% to about 95% or from 25 about 90% to about 95% of the three-dimensional object's mass prior to the recovery, when the three-dimensional object excludes filler. When the three-dimensional object includes filler material (typically introduced from the powder bed material), an amount of the polyolefin polymer recovered can be from about 80% to about 95% of the polyolefin polymer's mass in the three-dimensional object, for example.

An amount of time to dissolve a three-dimensional printed object in the polyolefin-dissolving solvent can vary. However, a three-dimensional printed object may dissolve in a polyolefin-dissolving solvent as long as the polyolefin polymer is dissolvable in the polyolefin-dissolving solvent under conditions suitable for dissolving the polyolefin polymer, e.g., temperature, time, solvent concentration, etc. For example, the dissolving can take from about 24 hours to about 168 hours, from about 36 hours to about 120 hours, or from about 48 hours to about 120 hours, without heat. In some examples, an amount of time for the dissolving can be sped up by reducing a size of the three-dimensional printed object, e.g., pulverizing or pelletizing the three-dimensional object to increase the surface area of the material exposed to the polyolefin-dissolving solvent, or by other methods such as by heating the polyolefin-dissolving solvent, increasing the concentration or volume of the polyolefin-dissolving solvent if it is diluted in a dissolving vehicle, etc.

If further detail, in one specific example, an amount of time to dissolve a three-dimensional printed object in the polyolefin-dissolving solvent can vary based on the size of a three-dimensional printed object or the size of parts thereof after being broken up into small sub-parts. Smaller three-dimensional printed objects will dissolve quicker in the polyolefin-dissolving solvent than larger three-dimensional printed objects. Accordingly, in some examples, the method can further reduce a size of the three-dimensional printed object prior to dissolving the object. A three-dimensional printed object can be reduced by grinding, cutting, crushing, sanding, or the like. In one example, the method can further include grinding or pulverizing the three-dimensional printed object to a smaller size in order to reduce dissolving time. For example, the three-dimensional printed object can be ground to particles that can have an average length ranging from about 1 mm to about 20 mm and a width perpendicular to the length ranging on average from about 1 mm to about 5 mm prior to dissolving. In another example, the three-dimensional printed object can be ground to particles that can have an average length ranging from about 2 mm to about 10 mm or from about 2 mm to about 5 mm prior to dissolving. In yet other examples, the three-dimensional printed object can be ground to particles that can have an average width ranging from about 2 mm to about 4 mm or from about 3 mm to about 5 mm prior to dissolving.

In another example, the dissolution time can vary based on a temperature of the polyolefin-dissolving solvent. In some examples, the dissolving can be sped up by heating the polyolefin-dissolving solvent, the three-dimensional printed object, or particles thereof, or a combination of these. For example, the method can include heating the three-dimensional printed object, or particles or portions thereof, and the polyolefin-dissolving solvent to a temperature ranging from about 160° C. to about 250° C. for a time period ranging from about 2 hours to about 48 hours under stirring action, e.g., rapid stirring or constant mixing. In other examples, the method can include heating the three-dimensional printed object and the polyolefin-dissolving solvent to a temperature ranging from about 160° C. to about 220° C., or from about 170° C. to about 210° C. for a time period of about 2 hours to about 48 hours, or from about 8 hours to about 36 hours, for example.

Upon dissolving, a particulate fusing compound becomes separable or separated from the polyolefin polymer and can become suspended in the solution of the polyolefin-dissolving solvent and the polyolefin polymer. The particulate fusing compound separated out can include, for example, particles of carbon black, lanthanum hexaboride, tungsten bronze, indium tin oxide, aluminum zinc oxide, ruthenium oxide, silver, gold, platinum, iron pyroxene, iron phosphate, copper pyrophosphate, or a combination thereof. In some examples, the particulate fusing compound can occur as suspended particles that can have a D50 particle size of from about 10 nm to about 5 μm, from about 20 nm to about 2 μm, from about 20 nm to about 1 μm, from about 30 nm to about 800 nm, or from about 50 nm to about 1 μm. In some examples, the dissolving can also separate particulate filler(s) (typically from the powder bed material) that may be present in the three-dimensional object from the three-dimensional printed object. The particulate filler may also likewise be suspended in the solution of the polyolefin-dissolving solvent and the polyolefin powder. Example particulate filler(s) that may be present in a three-dimensional object may be inorganic particles, such as glass beads, fiber glass, clay, silica, titanium dioxide, etc. The particulate filler that may be present can have a D50 particle size that can range from about 10 μm to about 300 μm, from about 10 μm to about 30 μm, from about 200 μm to about 300 μm, from about 50 μm to about 250 μm, or from about 10 μm to about 150 μm.

In some examples, the method can further include separating the particulate fusing compound or the particulate fusing compound (and particulate filler that may be present) from the polyolefin-dissolving solvent and the dissolved polyolefin polymer using filtration. The separating can include, in one example filtering the particulate fusing compound or the particulate fusing compound and the particulate filler from the polyolefin-dissolving solvent and the dissolved polyolefin polymer. The filtering can occur by mechanical filtration, reverse osmosis, granular media filtration, or the like. In one example, the filtering can occur by mechanical filtration. For example, depending on the size of the particulate fusing compound (and particulate filler if present) a mechanical mesh can be used having an average opening size from about 0.5 μm to about 1.5 μm, which value corresponds to particle retention rate. As an example, a 0.7 μm (700 nm) filter indicates that if there were theoretically only 0.7 μm diameter particles, the filter would capture 98% of the total particles. Using carbon black particles having a D50 value from about 100 nm, the filter may capture some of the particles, but not efficiently as 98% of the total particles (were the particles larger in size). Hence, when using a 0.7 μm filter, more of the carbon black particles would get through leaving a slight tinge of the black in the residual polymer. Thus, the use of a filter with a smaller mesh or opening size would capture a higher concentration of the carbon black particles. Thus, a balance of filtration efficiency and the amount of carbon black particles that should be removed can be considered so that the recovered polymer is pure enough for a given application.

This can filter out, for example, about 80% to about 95% of the particles above the mesh size selected for use, depending on particle morphology, agglomeration, or other physical characteristics that may be present with respect to the particulate fusing compound and/or fillers (typically from the powder bed material) that may be present. Thus, if carbon black particles are present that are about 100 nm or so, a filter having a pore size from about 0.5 μm to about 0.7 μm can be useable to filter out most of the carbon black particles from the dissolved polyolefin solution, though filter pore sizes outside of this range can be used, e.g., from about 0.3 μm to about 1 μm. With different sized particles to be removed, the filter pore size and/or density of pores can be adjusted to achieve a desirable result. If enough is removed, a clear solution may remain indicating that from most to essentially all of the carbon black particles have been removed.

The solution including the polyolefin-dissolving solvent and the dissolved polyolefin polymer can then be treated to separate the polyolefin-dissolving solvent from the dissolved polyolefin polymer by evaporation. The evaporation can occur by heating the polyolefin-dissolving solvent and the dissolved polyolefin polymer in a vacuum oven, for example, to a temperature ranging from about 70° C. to about 100° C. for a period of time ranging from about 20 hours to about 40 hours per 10 mL of the polyolefin-dissolving solvent and dissolved polyolefin polymer. In yet another example, the evaporation can occur by heating the polyolefin-dissolving solvent and the dissolved polyolefin polymer to a temperature ranging from about 75° C. to about 90° C. for a period of time ranging from about 24 hours to about 36 hours per 10 mL. In some examples, the evaporation can include rotary evaporation, flash evaporation, thermal and mechanical vapor recompression, plate evaporation, film evaporation, or the like. In one example, the evaporation can occur by rotary evaporation. In some examples, the evaporating can occur in conjunction with a vacuum trap, as mentioned. The vacuum trap can be used to collect the polyolefin-dissolving solvent evaporated off from the dissolved polyolefin polymer. The collected polyolefin-dissolving solvent may then be reused in an additional recovery of a polyolefin from a three-dimensional printed object. The resultant product, after separation of the particulate fusing compound (and particulate filler if present) and after evaporation of the dissolving solvent, can be a neat polyolefin polymer or a polyolefin polymer that may be from 90 wt % to about 99.99 wt % polyolefin polymer, with only a small concentration of impurities remaining that may have been introduced to the polyolefin three-dimensional object as part of the build process.

Figure 2:
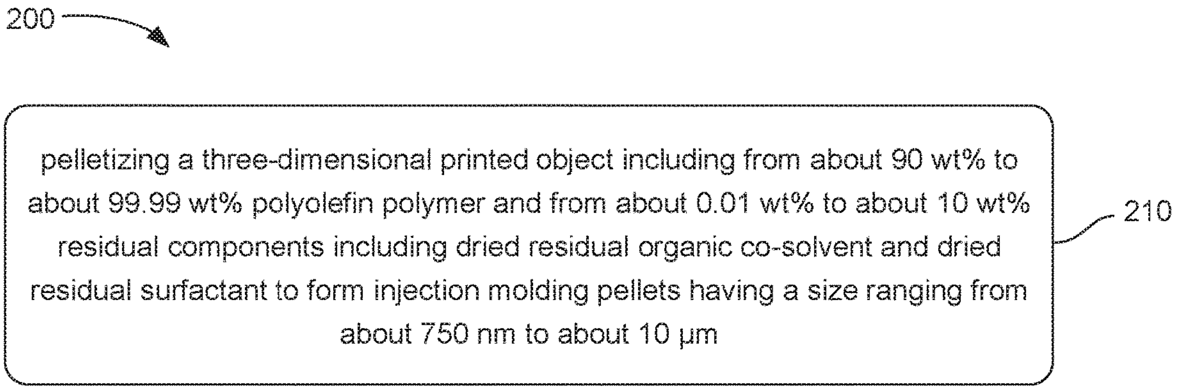
FIG. 2 is a flow diagram illustrating an example method of recycling polyolefin polymer from a three-dimensional printed object in accordance with the present disclosure.

Methods of Recycling Polyolefin Polymer from Three-Dimensional Printed Objects for Injection Molding In another example, a flow diagram of an alternative method 200 of recovering polyolefin polymer from a three-dimensional printed object is shown in FIG. 2. The method can include pelletizing 210 a three-dimensional printed object including from about 90 wt % to about 99.99 wt % polymer and from about 0.01 wt % to about 10 wt % residual components. The residual components can include dried residual organic co-solvent and/or dried residual surfactant. In some examples, the injection molding pellets can further include particulate fusing compound. In another example, the injection molding pellets can further include particulate filler (typically introduced from the powder bed material) as residual components. The method can form injection molding pellets having a size that can range from about 750 nm to about 10 μm, in one example. In yet other examples, the injection molding pellets can have a size ranging from about 1 μm to about 10 μm, from about 750 nm to about 5 μm, or from about 800 μm to about 2 μm.

The three-dimensional object can be processed similarly as described with respect to the method of recovering polyolefin polymer if there are particulates therein, such as particulate fusing compounds and/or fillers (typically from the powder bed material). For example, the three-dimensional object can be pulverized and/or broken apart if desired. The polyolefin polymer can be separate from any particles to be separated therefrom by dissolving in a poly-olefin-dissolving solvent, such as, a multi-halogenated aromatic compound, e.g., a trihalogenated benzene. For example, a chloro-substituted benzene can be effective for use, e.g., 1,2,4-trichlorobenzene, 1,2,4-tribromobenzene, 1,3,5-trichlorobenzene, or 1,3,5-tribromobenzene. Rapid stirring and/or agitation can be used, as well as heat, as previously described, to dissolve the polymer and suspend the unwanted particles. Heat, filtering, or other separation techniques can be used to remove the particles therefrom, and then the polyolefin-dissolving solvent can be removed as also previously described. In instances where the particulate fusing compounds and/or particulate filler are essentially fully removed, the recovered polyolefin polymer can be recycled with residual amounts of organic solvent and/or surfactant remaining present within the polyolefin polymer. In some instances, there may be some particulates remaining, even though most have been removed by the process described herein. The polyolefin polymer with residual components remaining can be pelletized for subsequent use, such as for injection molding pellets.

In some examples, the method can further include forming an injection molded object with the injection molding pellets. During injection molding the injection molding pellets can be melted and extruded into a mold to form the injected molded object. In some examples, the melting and the extruding can include feeding the injection molding pellets into a heated barrel including a helical shaped screw, extruding a molten liquid of the injection molding pellets into the a mold cavity, and allowing the molten liquid to cool and solidify in the mold cavity to form an injection molded object having an inverse shape of the mold cavity. In yet other examples, the method can further include removing the injection molded object from the mold cavity.

An injection molded object formed using the injection molding pellets can exhibit substantially similar stiffness to a comparable injection molded object having the same dimensions that was formed from comparable injection molding pellets that include the polyolefin polymer but exclude the residual components. In an example, a stiffness of the injection molded object can be within about 1% to about 10%, within about 1% to about 5%, within about 2% to about 8%, within about 3% to about 9% or within about 5% to about 10% of a stiffness of a comparable object. Stiffness can be determined by measuring Young's modulus using a tensile test, e.g. ASTM D638.

An injection molded object formed form the injection molding pellets can also exhibit substantially similar tensile strength to a comparable injection molded object having the same dimensions that was formed from comparable injection molding pellets that include the polyolefin polymer but exclude the residual components. In an example, a tensile strength of the injection molded object can be within about 1% to about 10%, within about 1% to about 5%, within about 2% to about 8%, within about 3% to about 9% or within about 5% to about 10% of a tensile strength of a comparable object. Tensile strength can also be determined by measuring Young's modulus using a tensile test, e.g. ASTM D638.

Recovered Polyolefin Polymer

Figure 3:
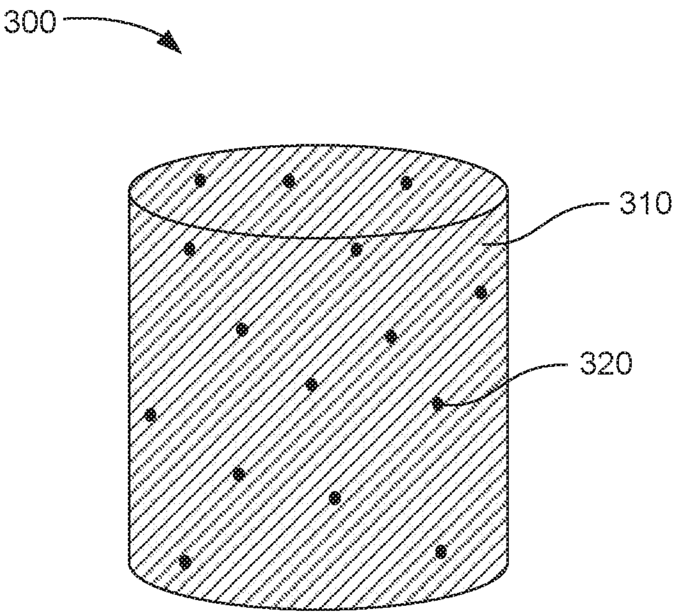
FIG. 3 is a schematic illustration of an example recovered polyolefin polymer from a three-dimensional printed object in accordance with the present disclosure.

In a further example, as shown in FIG. 3, a recovered polymer 300 from a three-dimensional printed object can be in the form of an injection molding pellet(s) or particulate build material suitable for additional three-dimensional builds that utilize a powder bed as the bulk material. The recovered polyolefin polymer can likewise be used for other purposes as well. The recovered product can include polyolefin polymer 310 and residual components 320. The recovered polyolefin polymer may be in the form of D50 injection molding pellets having a size from about 750 nm to about 10 μm. If recovered for the purpose of using as a powder bed material for three dimensional printing, the particle size can be from about 10 μm to about 150 μm or any of the other sub-ranges described herein for powder bed material use, for example. The recovered polymer when used can conform to a shape of the container that the method was carried out in. The recovered polyolefin polymer is not particularly limited, but can be, for example, a polypropylene polymer, a polyethylene polymer, or a polyethylene-polyethylene copolymer. These polymers may be recovered and then formed into injection molding pellets that include residual components or may be formed into other materials, such as polyolefin particulates suitable for use again as particulate polyolefin material for a powder bed material for three-dimensional printing.

The recovered polyolefin polymer can include from about 90 wt % to about 99.99 wt % polyolefin polymer and collectively from about 0.01 wt % to about 10 wt % residual components introduced from the fusing agent and/or particulate filler. Notably, whatever the weight percentage of residual components remaining in the recovered polyolefin polymer, there will be less of these components than were present prior to recovery of the polyolefin polymer, e.g., greater than a 50 wt % reduction, greater than a 100 wt % reduction, greater than a 200 wt % reduction of residual components, or greater than a 500 wt % reduction of the residual components in the recovered polyolefin polymer. That stated, the recovered polyolefin polymer will still contain from about 0.01 wt % to 10 wt %, from about 0.05 wt % to about 5 wt %, from about 0.1 wt % to about 2.5 wt %, from about 1 wt % to about 5 wt %, or from about 2 wt % to about 5 wt % of the residual components. For example, the fusing agent may introduce organic liquid components that remain with the recovered polyolefin polymer as dried residual organic solvent and/or dried residual surfactant. In some instances, there may also be some particulate fusing compound (from the fusing agent) that is not separated fully therefrom, thus leaving from about 0.01 wt % to about 2 wt % or from about 0.01 wt % to less than about 1 wt % particulate fusing compound. In some examples, the residual components that remain may also have been introduced as a particulate filler (typically blended into the powder bed material prior to a three-dimensional object build). In some instances where those are introduced, some of that particulate material may likewise remain if it is not fully removed, e.g., from about 0.01 wt % to 5 wt % or from about 0.1 wt % to 3 wt %. In some examples, if the processes herein are carried out efficiently, the amount of polyolefin polymer that remains in the recovered polyolefin product may be the same or substantially equivalent to the amount of polymer from the three-dimensional printed object that is being recycled, e.g., from about 80 wt % to 100 wt %, from about 85 wt % to 100 wt %, from about 90 wt % to 100 wt %, from about 95 wt % to 100 wt %, or from about 98 wt % to 100 wt %, for example. In some examples, recovery of polyolefin polymer that is less efficient can also be beneficial because any amount of recovered polyolefin polymer that can be recovered or recycled could create less waste and be environmentally friendly, provided the cost of the recycling is not greater than the efficiency of polyolefin polymer recover.

Thus, recovering from about 50 wt % to about 80 wt % of the polyolefin polymer can likewise be beneficial in many instances.

In further detail regarding the residual components that may remain in the recovered polyolefin polymer (pellets, particles, bulk polymer, etc.), there may be dried residual organic solvent and/or dried residual surfactant. The dried residual surfactant can include residue from 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), ethanol, methanol, propanol, acetone, tetrahydrofuran, hexane, 1-butanol, 2-butanol, tert-butanol, isopropanol, propylene glycol, methyl ethyl ketone, dimethylformamide, 1,4-dioxone, acetonitrile, 1,2-butanediol, 1-methyl-2,3-propanediol, 2-pyrrolidone, glycerol, 2-phyenoxyethanol, 2-phenylethanol, 3-phenylpropanol, or a combination thereof. The dried residual surfactant can include residue from non-ionic surfactants, anionic surfactants, cationic surfactants, or a combination thereof. Example non-ionic surfactants can include a self-emulsifiable, nonionic wetting agent based on acetylenic diol chemistry (e.g., SURFYNOL® SEF from Air Products and Chemicals, Inc. (USA)), a nonionic fluorosurfactant (e.g., CAPSTONE® fluorosurfactants from DuPont (USA)), and combinations thereof. In other examples, the surfactant residue can include ethoxylated low-foam wetting agent (e.g., SURFYNOL® 440, SURFYNOL® 465, or SURFYNOL® CT-111 from Air Products and Chemical Inc. (USA)) or an ethoxylated wetting agent and molecular defoamer (e.g., SURFYNOL® 420 from Air Products and Chemical Inc. (USA)). Still other surfactant residue can include non-ionic wetting agents and molecular defoamers (e.g., SURFYNOL® 104E from Air Products and Chemical Inc. (USA)), non-ionic, alkylphenylethoxylate, and solvent free surfactant blends (e.g., SURFYNOL® CT-211 from Air Products and Chemicals, Inc. (USA)), water-soluble, non-ionic surfactants (e.g., TERGITOL® TMN-6, TERGITOL® 15S7, and TERGITOL® 15S9 from The Dow Chemical Company (USA)), and combinations thereof. In another example, the surfactant residue can include residue from a non-ionic organic surfactant (e.g., TEGO® Wet 510 from Evonik Industries AG (Germany)), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company (USA)), and combinations thereof. Examples of anionic surfactants can include alkyldiphenyloxide disulfonate (e.g., DOWFAX® 8390 and DOWFAX® 2A1 from The Dow Chemical Company (USA)). An example of cationic surfactants can include dodecyltrimethylammonium chloride and hexadecyldimethylammonium chloride.

In some examples, the residual components can further include a particulate fusing compound. The particulate fusing compound can include, in an example, carbon black, lanthanum hexaboride, tungsten bronze, indium tin oxide, aluminum zinc oxide, ruthenium oxide, silver, gold, platinum, iron pyroxene, iron phosphate, copper pyrophosphate, metal dithiolene complex, metal nanoparticles, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, or a combination thereof. In another example, the particulate fusing compound can include carbon black, lanthanum hexaboride, tungsten bronze, indium tin oxide, aluminum zinc oxide, ruthenium oxide, silver, gold, platinum, iron pyroxene, iron phosphate, copper pyrophosphate, or a combination thereof. In one example, the residual components may exclude particulate fusing compound. Recovered polymer that does not include particulate fusing compound may be recovered from a three-dimensional printed object using the method of recovering polyolefin polymer, as previously described herein.

In yet other examples, the residual components can include dried residual dispersant. Dried residual dispersants can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

In yet other examples, the residual components may further include dried residue from a chelating agent, an antimicrobial agent, a buffer, or a combination thereof. Examples of chelating agents can include disodium ethylene-diaminetetraacetic acid (EDTA-Na), ethylene diamine tetra acetic acid (EDTA), and methyl-glycinediacetic acid (e.g., TRILON® M from BASF Corp., Germany). Example antimicrobial agents can include the NUOSEPT® (Ashland Inc., USA), VANCIDE® (R.T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. Example buffer can include a polyhydroxy functional amine, potassium hydroxide, 2-[4-(2-hydroxyethyl) piperazin-1-yl]ethane sulfonic acid, 2-amino-2-(hydroxymethyl)-1,3-propanediol (TRIZMA® sold by Millipore-Sigma, Germany), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof.

Residual components that may be present in the recovered polyolefin polymer that may not be separated out or may only be partially separated out can include particulate filler or additives introduced with the powder bed material with the particulate polyolefin polymer. Examples of such particulate filler that may be present in the recovered polyolefin polymer can include flow additives, antioxidants, inorganic particles, or any combination thereof. Typically, an amount of any of these or other similar components can be at about 5 wt % or less or at about 3 wt % of less. An example flow additive can include fumed silica. Example antioxidants can include hindered phenols, phosphites, thioethers, hindered amines, and/or the like. Example inorganic filler can include particles such as alumina, silica, fibers, carbon nanotubes, cellulose, and/or the like. In some examples, the additive may be embedded or composited with polymer during three-dimensional printing.

DEFINITIONS

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 10 wt % includes 1 wt % to 5 wt % as an explicitly supported sub-range.

The terms "D50 particle size" or "particle size," as used herein, refer to the diameter of a substantially spherical particle, or the effective diameter of a non-spherical particle, e.g., the diameter of a sphere with the same mass and density as the non-spherical particle as determined by weight. This particle size can be based on a particle size distribution where 50% of the particles are larger than the D50 value and 50% of the particles are smaller than the D50 value. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter. An average particle size can refer to a mathematical average of the particle sizes.

As used herein, a plurality of items, structural elements, compositional elements, and/or materials may be presented in a common list for convenience. However, these lists should be construed as though an individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Recovering Polyolefin Polymer from a Three-Dimensional Printed Object A three-dimensional printed object having a rectangular dimension of 2 inches by 4 inches and a thickness of from about ⅛ inch to about ¼ inch was printed using 100 wt % polypropylene polymer particles with fusing agent including a carbon black particulate fusing compound having a D50 particle size of about 100 nm. The three-dimensional printed object was then recycled by grinding the three-dimensional printed object to particles having a D50 particle size ranging from about 1 mm to about 5 mm, followed by suspending 0.055 g of the particles per 13 mL 1,2,4-trichlorobenzene as the polyolefin-dissolving solvent. The polyolefin-dissolving solvent and the ground particles of the three-dimensional printed object were then heated to about 200° C. for about 24 hours with rapid stirring (500 RPM for 24 hours). Upon dissolving, a solution remained that included the polyolefin-dissolving solvent and dissolved polyolefin polymer (with the carbon black particulate fusing compound suspended therein). The carbon black particles were separated from the solution by retaining the temperature of the solution with suspended carbon black particles above 160° C. and mechanically filtering the solution using a 0.7 μm Whatman® 6825-2517 puradisc (available from Millipore-Sigma, Germany), which was selected to filter out at least 90% of the particle sizes above 100 nm. Following separation, the puradisc was black indicating that the puradisc retained the carbon black particulate fusing compound that was originally present in the three-dimensional printed object. An optically clear filtered solution remained. To separate the 1,2,4-trichlorobenzene polyolefin-dissolving solvent from the dissolved polyolefin polymer, the filtered solution was then placed in a vacuum oven for about 15 hours (about 30 hours per 10 mL) at about 80° C. until the 1,2,4-trichlorobenzene was evaporated off. A vacuum trap was used in conjunction with the vacuum oven to recover the 1,2,4-trichlorobenzene, thereby retaining the 1,2,4-trichlorobenzene for future use. Neat polyolefin polymer was recovered that weighed about 90% of the initial mass of the three-dimensional printed object. Carbon black was not visibly present in the recovered polyolefin polymer which exhibited a clear appearance. It is estimated that about 95 wt % to close to 100 wt % of the polyolefin polymer from the three-dimensional printed object was recovered.

Example 2—Comparative Recovery of Polyolefin Polymer from a Three-Dimensional Printed Object The same procedures were attempted as set forth in Example 1, except that m-cresol was used as the dissolving solvent rather than 1,2,4-trichlorobenzene. Unlike the 1,2,4-trichlorobenzene, the m-cresol was not able to dissolve the polypropylene particles, so the experiment was ceased at this point using m-cresol.

What is claimed is:

1. A method of recovering a polyolefin polymer from a three-dimensional printed object, the method comprising:

reducing a size of the three-dimensional printed object to particles, wherein the particles include from about 0.1 wt % to about 10 wt % of residual components including a particulate fusing compound and from about 90 wt % to about 99.9 wt % of the polyolefin polymer;

dissolving the polyolefin polymer of the particles in a polyolefin-dissolving solvent to form a solution of the polyolefin-dissolving solvent and the polyolefin polymer, wherein the particulate fusing compound remains suspended in the solution, and wherein the polyolefin-dissolving solvent is a halogenated aromatic solvent;

separating the particulate fusing compound from the solution; and evaporating the polyolefin-dissolving solvent, thereby recovering the polyolefin polymer from the solution.

2. The method of claim 1, wherein the halogenated aromatic solvent is selected from the group consisting of 1,2,4-trichlorobenzene, 1,2,4-tribromobenzene, 1,3,5-trichlorobenzene, and 1,3,5-tribromobenzene.

3. The method of claim 1, wherein the particulate fusing compound has a D50 particle size of from about 10 nm to about 5 μm.

4. The method of claim 1, wherein the particulate fusing compound is selected from the group consisting of carbon black, lanthanum hexaboride, tungsten bronze, indium tin oxide, aluminum zinc oxide, ruthenium oxide, silver, gold, platinum, iron pyroxene, iron phosphate, copper pyrophosphate, and a combination thereof.

5. The method of claim 1, wherein the separating includes filtering the particulate fusing compound from the solution.

6. The method of claim 1, wherein the reducing of the size includes grinding the three-dimensional printed object into the particles having a particle size with i) a length from about 3 mm to about 20 mm and ii) a width or diameter perpendicular to the length from about 2 mm to about 5 mm.

7. The method of claim 1, further comprising applying heat during the dissolving, wherein the heat is applied at a temperature ranging from about 160° C. to about 250° C. for a time period ranging from about 1 hour to about 24 hours.

8. The method of claim 7, further comprising agitating the solution while applying the heat during the dissolving.

9. The method of claim 1, wherein the evaporating occurs in conjunction with a vacuum trap to collect the polyolefin-dissolving solvent evaporated from the solution.

10. The method of claim 1, wherein during the evaporating, from about 90 wt % to about 99.99 wt % of the polyolefin polymer is recovered.

11. The method of claim 10, wherein during the evaporating, from about 0.01 wt % to about 10 wt % of the residual components are also recovered, and wherein the residual components include dried residual organic solvent from the particles of the three-dimensional printed object, dried residual surfactant from the particles of the three-dimensional printed object, a particulate filler from the particles of the three-dimensional printed object, from about 0.01 wt % to about 2 wt % of the particulate fusing compound remaining after the separating, or a combination thereof.

* * * * *